(12) United States Patent
Gretz

(10) Patent No.: US 6,177,633 B1
(45) Date of Patent: Jan. 23, 2001

(54) CABLE CONNECTOR

(75) Inventor: Thomas J. Gretz, Clarks Summit, PA (US)

(73) Assignee: Arlington Industries, Inc., Scranton, PA (US)

( * ) Notice: Under 35 U.S.C. 154(b), the term of this patent shall be extended for 0 days.

(21) Appl. No.: 09/329,442

(22) Filed: Jun. 10, 1999

(51) Int. Cl.⁷ .................................................. H02G 3/22
(52) U.S. Cl. .............................. 174/65 G; 174/153 G; 174/65 R
(58) Field of Search ............................. 174/65 R, 153 G, 174/65 G

(56) References Cited

U.S. PATENT DOCUMENTS

| | | | |
|---|---|---|---|
| 3,873,759 | * | 3/1975 | Schindler et al. .................. 174/65 R |
| 4,591,658 | * | 5/1986 | Bauer et al. ........................ 174/65 R |
| 4,970,350 | * | 11/1990 | Harrington ........................ 174/153 G |
| 4,972,044 | * | 11/1990 | Kropa .................................. 174/65 R |
| 5,037,318 | * | 8/1991 | Robertson ............................ 174/65 R |
| 5,132,493 | * | 7/1992 | Sheehan .............................. 174/65 R |
| 5,539,152 | * | 7/1996 | Gretz .................................... 174/65 R |
| 5,594,209 | * | 1/1997 | Nattel et al. ...................... 174/153 G |

* cited by examiner

Primary Examiner—Kristine Kincaid
Assistant Examiner—Angel R. Estrada

(57) ABSTRACT

An integrally molded connector clamp including a cylindrical housing defining a passage for a cable and a slot in its outer perimeter that permits its compression and insertion into the knockout of an electrical junction box. Within the housing there is a resiliently deflectable retaining element having at its outer extremity serrations or teeth running perpendicular to the axis of the cylinder for retaining an inserted cable. Through the wall of the cylinder at a point facing the serrations there is an aperture in the cylinder wall that permits access to the retaining element for purposes of releasing same from engagement with the inserted cable.

3 Claims, 2 Drawing Sheets

CABLE CONNECTOR

FIELD OF THE INVENTION

The present invention relates to electrical cable clamps, and more specifically to electrical connector clamps including a back-out prevention feature for securing electrical cables to wiring enclosures.

BACKGROUND OF THE INVENTION

The wiring of electrical devices requires that electrical cables be inserted through openings or holes in junction boxes, panel boxes and the like. Electrical codes generally require that such access holes be substantially filed after insertion of electrical cable and the some means be provided to inhibit retraction of the electrical cable from the access hole after installation to eliminate the possibility of accidental disconnection of the electrical connections internal to the panel box, junction box, etc. The most commonly used connector to provide such utility until recently has been a two-part device that permitted passage of the cabling through a circular collar that passed through the access hole and provided means for securing the cabling inside the circular collar and a lock nut or other means for, in turn, securing the collar to the access hole. Such devices are unwieldy and sometimes difficult to install, especially when space is limited, because of the number of parts involved and the need to apply screw drivers and wrenches to attain proper and secure attachment.

More recently, unitary plastic, strain relief, cable connector clamps, that include a self-locking mechanism as well as a cable retention system have been developed and found broader application. This type of cable clamp or connector is essentially tubular with a slit along one side to enable the connector to be squeezed for insertion into the access hole in the panel box, junction box, etc. It then resiliently returns to its original shape and is provided with protruding ribs to lock it into the opening.

It is common practice to include in the tubular portion of such connectors, clamping elements that resiliently deflect as the cable is inserted, with the free end of the clamping element biased against the cable sheath so as to engage the sheath between the clamping element and the inner wall of the connector to thereby prevent the cable from being readily withdrawn from the connector.

One such device is described in U.S. Pat. No. 5,594,209 to Nattel et al issued Jan. 14, 1997. This patent suggests a connector, as just described, that includes an internal clamping element that has a clamping lip that is resiliently pressed against the cable to prevent its removal from the connector. The clamping lip is described as having a reduced thickness at its free end and including additional projections on the inner wall of the tubular housing, which additional projections have abutment faces perpendicular to the axis of the housing.

U.S. Pat. No. 4,970,350 to Harrington, issued Nov. 13, 1990 describes a similar such connector device comprising a housing having first and second open ends and an inner wall forming a channel extending through the housing for receiving a cable. A coupling means is mounted within the housing for urging the cable towards the inner wall and includes a flange, means for grippingly engaging the cable between the inner wall and the flange, and an elongated bracing pin for providing resistance to bending of the flange.

While both of the foregoing patented devices provide useful solutions to the stated problem of providing a simple to use cable connector, their design is not optimal since they rely largely on simple friction or the presence of a single sharp surface to inhibit "pullout" of the inserted cable. Although the devices described in the foregoing patents allege an ability to retain a wide range of cable diameters, the range of their utility is really quite limited because of their design.

A better arrangement would provide a serrated engagement surface for retaining the inserted cable. Such a design provides a more secure retention of the inserted cable. The use of such a serrated surface, if properly designed, has the additional benefit of being more readily adaptable to a larger variety of cable diameters without sacrificing cable retention capability. The manufacture of such a connector using conventional plastic molding techniques is, however, not simple and requires redesign of the connector to obtain the required serrated contact points at the proper location and with the proper orientation in such a process.

Also, prior art such clamping or connector devices provide no means for releasing the retained cable without removing the entire connector assembly from its mounting in the junction box.

OBJECTS OF THE INVENTION

It is therefore an object of the present invention to provide a simple and easily installed connector for the attachment of electrical cabling to electrical panel boxes, junction boxes and the like that has the ability to securely retain a broad range of cable sizes and diameters while permitting release of the retained cable without removal of the connector from the junction box.

It is another object of the present invention to provide such a connector that is easily manufactured using conventional plastic molding techniques.

SUMMARY OF THE INVENTION

The connector clamp of the present invention is integrally molded from a resilient plastic material and comprises a cylindrical housing defining a passage for a cable and a slot in its outer perimeter that permits its compression and insertion into the knockout hole of an electrical junction box. Within the housing there is a resiliently deflectable retaining element having serrations or teeth running perpendicular to the axis of the cylinder for retaining an inserted cable. Through the wall of the cylinder at a point facing the serrations there is an aperture in the cylinder wall that permits access to the retaining element for purposes of releasing same from engagement with the inserted cable, assuming the size of the cable permits proper access. This aperture also serves as an access point for insertion of a core used in molding the serrations at the optimum angle perpendicular to the cylinder axis without significantly modifying the molding process.

DETAILED DESCRIPTION

The connector clamp of the present invention while sharing the cylindrical shape and split side of prior art such devices presents significant improvements in its ability to securely retain a broad range of cable sizes more effectively by virtue of its serrated perpendicularly arranged teeth, while also providing a means to selectively release a retained cable without disassembly of the connector from the junction or other electrical box.

Figure 1:
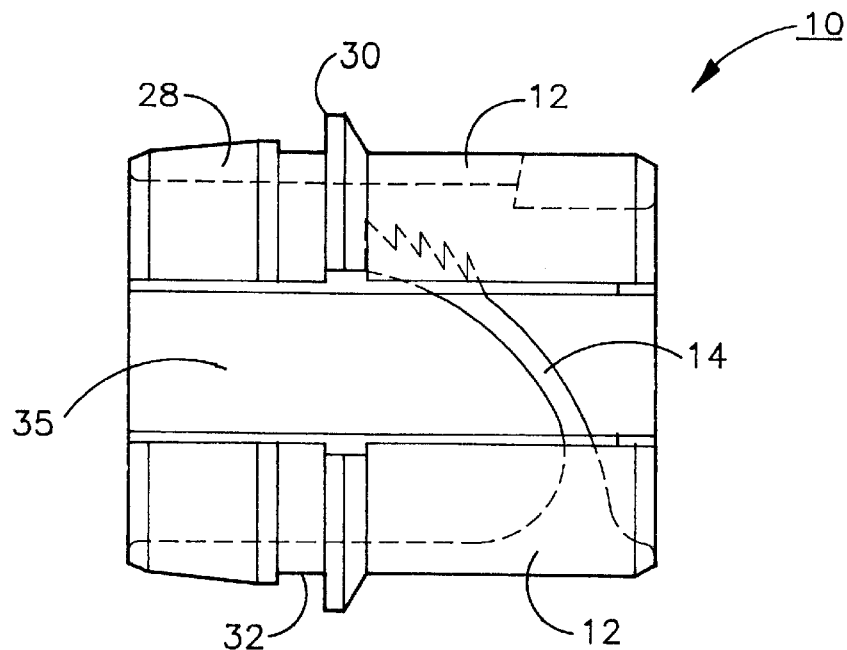
FIG. 1 is a side view of the connector of the present invention.

As shown in FIG. 1, the connector 10 of the present invention comprises a generally cylindrical housing 12 having a flange or retaining means 14 mounted therein. Housing 12 and flange 14 are integrally formed, preferably by compression molding, from a resilient plastic material that permits resilient radial compression of housing 12 when conventionally inserted into the aperture provided by removal of a knockout in an electrical junction box or the like, and resilient deflection or bending of flange 14 when a cable is inserted through housing 12, as discussed in greater detail below.

Figure 2:
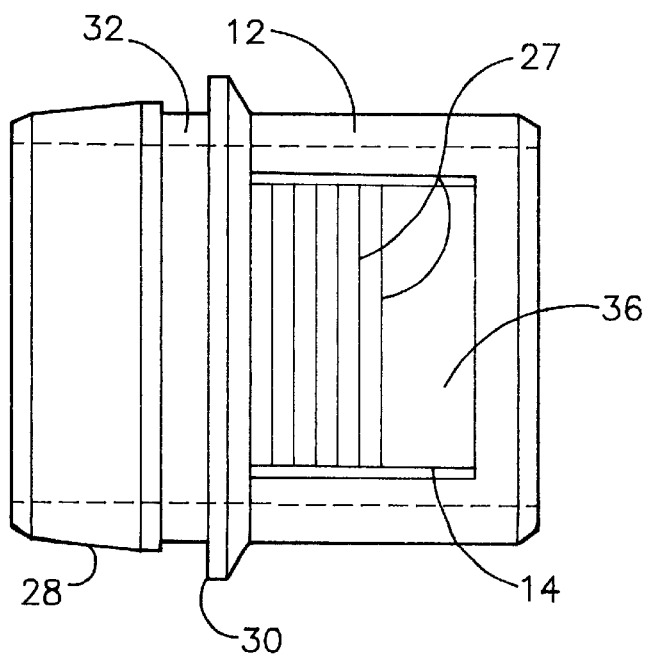
FIG. 2 is a top view of the connector of the present invention.
Figure 3:
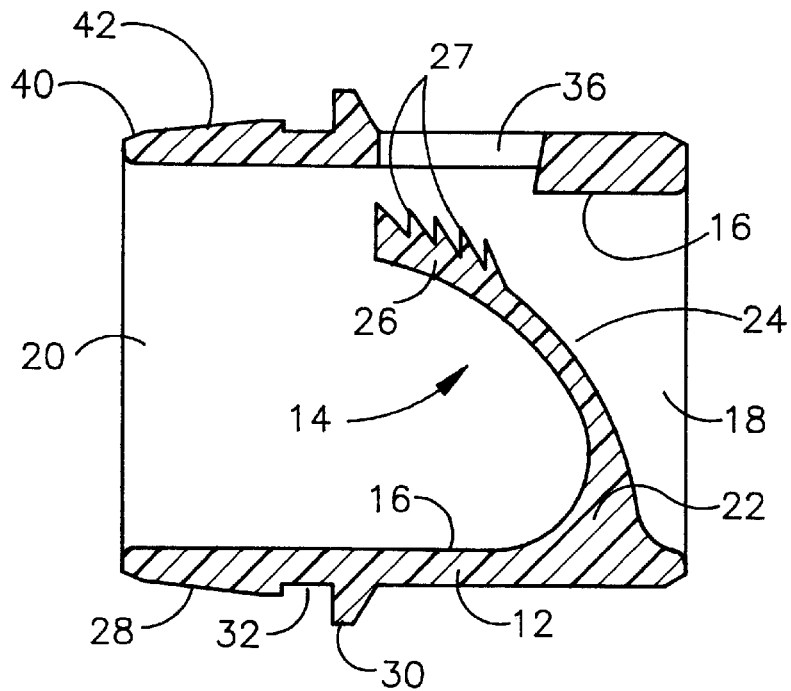
FIG. 3 is a cross-sectional view of the connector of FIG. 1.

Housing 12 has a cylindrical cross-section and includes an inner wall 16 which forms a cylindrical channel extending through housing 12 between open ends 18 and 20. Lower portion 22 of flange 14 is mounted to inner wall 16 (by means of integral formation). Mid and upper portions 24 and 26 of flange 14 extend upwardly from lower portion 22 at an angle forward in the channel in the direction of open end 20. The position of flange 14 as shown in FIG. 2 is the normal position assumed by flange 14 in the absence of any applied force or any inserted cable.

Figure 4:
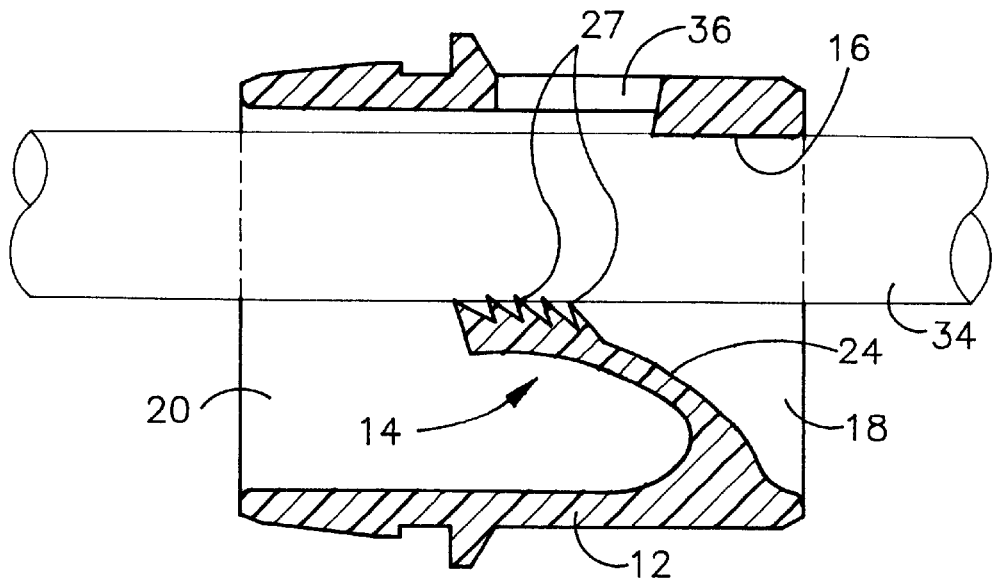
FIG. 4 is a cross-sectional view of the connector of the present invention having an electrical cable inserted therethrough and retained therein.

Upper or terminal end 26 of flange 14 includes serrations or teeth 27 integrally formed with flange 14 and running perpendicular to the axis of the channel defined by inner wall 16 of housing 12. Serrations 27 are designed to engage the outer sheathing of an inserted cable 34 as shown in FIG. 4. As depicted in FIG. 4, when an electrical cable 34 is inserted through housing 12 from open end 18, flange 14 is deflected inwardly toward open end 20 and serrations 27 engage the outer sheath of cable. Any force applied to remove cable 34 in the direction of open end 18, i.e. out of a panel or junction box to which connector 10 having cable 34 therein has been applied, will result in an upward force being applied to flange 14 and increased resistance to removal by virtue of the application of additional pressure of teeth 27 against cable 34. Flange 14, and consequently serrations or teeth 27 have a width dimension, i.e. a length, approximately equal to the width of aperture 36 in wall 16 of housing 12. Preferably, this is on the order of ¾" for most conventional connectors. The presence of a plurality of teeth 27, in the preferred configuration 3–5, but possibly more depending upon the ability to form teeth 27 in the molding process, assures engagement of teeth 27 with a wide range of cable sizes, as teeth 27 further toward mid portion 24 of flange 14 contact inserted cable 34 as the size or diameter of cable 34 increases.

Although the primary purpose of aperture 36 is to provide a means for access of a molding core to permit formation of teeth 27 on flange 14 in the manufacturing process, it also serves the additional function of providing access to the inside housing 12 to permit, with a properly designed tool, and in the case of an appropriately sized cable 34, the depression of upper end 26 of flange 14 away from cable 34 to allow removal of cable 34 from engagement with serrations or teeth 27 and thus removal of cable 34 from housing 12, if desired. In the case where cable 34 is less than the width dimension of aperture 36, a simple screwdriver will permit depression of flange 14 to permit retraction of cable 34 from housing 12 through open end 18.

As best shown in FIG. 1, housing 12 is designed to snappingly engage the aperture created by the removal of a knockout in a panel or electrical junction box through which a cable is to be extended. For this purpose, housing 12 includes a pair of circumferential flanges 28 and 30 defining a circumferential channel 32 therebetween. Housing 12 also includes an elongated longitudinal slot 35 that permits resilient radial compression of connector 10 when connector 10 is inserted into an appropriate aperture in a panel box, electrical junction box or the like in the conventional fashion, and as shown in the prior art. The shape or design of flanges 28 and 30 are not particularly critical importance to the successful practice of the present invention and accordingly can be of any suitable design many of which are described n the prior art. The presence of a tapered nose 40 and tapering 42 of flange 28, as shown in the drawings, is useful, however, in facilitating insertion of connector 10 into a panel box or electrical junction box knockout aperture.

FIG. 2 shows aperture 36, teeth 27 on flange 14, housing 12 and circumferential flanges 28 and 30 that define channel 32 as viewed from above aperture 36 when connector 10 is laid down horizontally.

As the invention has been described, it will be apparent to those skilled in the art that the same may be varied in many ways without departing from the spirit and scope of the invention. Any and all such modifications are intended to be included within the scope of the appended claims.

What is claimed is:

1. In a cable connector for attaching an electrical cable to a panel box, or electrical junction box comprising;

a) a housing having first and second open ends and an inner wall forming a channel extending through the housing between said ends for longitudinally receiving an electrical wire or cable from said first open end, and an outer wall;

b) a flange having a lower portion integrally formed with said inner wall, and a mid and upper portion extending inwardly and inclined toward said second end, said flange being resiliently bendable to permit sliding passage of said cable between said inner wall and said flange when said cable is inserted through said first end and moved through said channel, and including means for grippingly engaging said cable between said inner wall and said flange when retraction of said cable in the direction of said first end is attempted;

the improvements comprising the integral incorporation on said upper portion of a plurality of teeth running perpendicular to the axis of said channel and facing said inner wall closest to said upper portion as said gripping means and the inclusion of an aperture in said housing facing said teeth and permitting access to said teeth from outside said housing.

2. The cable connector of claim 1 wherein said teeth are elongated and including at least 3 of said elongated teeth.

3. The cable connector of claim 2 including at least 5 of said elongated teeth.

* * * * *